Jan. 23, 1968  J. D. KRANTZ  3,365,127
VACUUM PUMP AND MOTOR ASSEMBLY
Filed Sept. 21, 1965

INVENTOR.
JOHN D. KRANTZ
BY
Elliott & Pastoriza
ATTORNEYS

United States Patent Office 3,365,127
Patented Jan. 23, 1968

3,365,127
VACUUM PUMP AND MOTOR ASSEMBLY
John D. Krantz, Inglewood, Calif., assignor to Coastal Dynamics Corporation, a corporation of California
Filed Sept. 21, 1965, Ser. No. 488,847
4 Claims. (Cl. 230—139)

ABSTRACT OF THE DISCLOSURE

This disclosure relates to a method of assembly and the assembly components themselves of a pump and motor. The pump shaft is designed to be received within a bearing structure with its opposite ends protruding such that one end can receive in a press fit suitable impeller means or vanes and the other end be exposed for coupling to the motor shaft. This other end is provided with a cylindrical sleeve secured to the end of the pump shaft for rotation therewith and including an internal longitudinal slot. The motor shaft in turn is arranged to be received in the other end of the sleeve and includes an external longitudinal slot. A key is positioned in the slots to thereby couple the motor shaft to the pump shaft for rotation.

---

This invention relates generally to pump and motor assemblies and more particularly to an improved method and means for coupling a vacuum pump rotor to a motor shaft.

Pump and motor units as presently constructed are often coupled together in a manner which makes it difficult to disassemble a unit to repair elements which have become worn or damaged.

In some units, for example, the motor shaft is directly secured to the pump rotor, such that disassembly often requires that the shaft be cut in order to reach worn or damaged elements.

It is accordingly, a primary object of this invention to provide a novel pump and motor assembly which can be assembled and disassembled quickly and easily to the end that repairs may be easily effected.

Another object is to provide a pump and motor assembly meeting the foregoing object and yet which is of simple, rugged construction.

Briefly, these and other objects and advantages of this invention are attained by providing a pump coupled to a motor so as to be driven thereby. The pump is of the type that includes a chamber within which is disposed an eccentrically-mounted vane-type rotor having a shaft journaled within the pump casing. The pump shaft is detachably connected to a coaxially positioned motor shaft by means of a coupling sleeve, made, for example, of steel. The coupling sleeve and motor shaft are preferably provided with slot means adapted to receive a key member to secure the shafts and sleeve in assembled driving relationship. Further, the motor and pump casings are detachably secured. With this arrangement, the motor and pump may be easily disassembled and reassembled.

Figure 1:
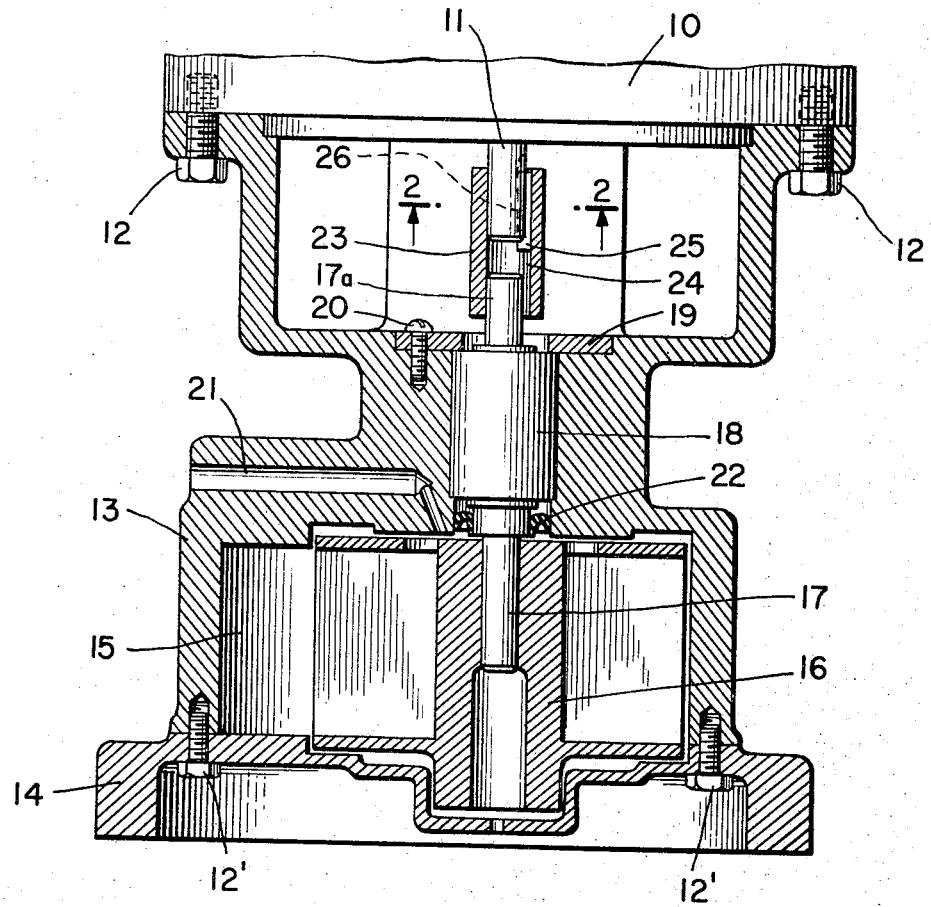
Figure 2:
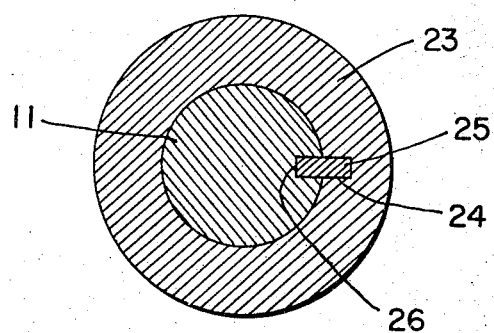

A better understanding of the invention may now be had by referring to a preferred embodiment thereof, as illustrated in the accompanying drawings, in which:

FIGURE 1 is a fragmentary cross-section view of the pump and motor assembly; and, FIGURE 2 is an enlarged cross-section of the motor shaft taken in the direction of arrows 2—2 of FIGURE 1.

Referring first to FIGURE 1, there is shown a bottom portion of a motor 10 having a shaft 11 extending downwardly therefrom. The motor 10 is secured as by bolts 12 to the upper portion of a pump casing 13, in turn bolted to a base plate 14.

The interior of the pump casing 13 defines a cylindrical pump chamber 15 within which is disposed an eccentrically mounted vane-type rotor 16. Secured to the pump rotor 16 by means of a press-fit engagement is a pump shaft 17 journaled within a bearing assembly 18. The bearing assembly 18 is held within the pump casing 13 by means of a retainer ring 19 and lock screws 20.

Defined within the pump casing 13 is a water inlet port 21 which communicates with the space defined between the top of the pump rotor 16 and the top of the pump chamber 15. The purpose of the port 21 is to permit water to be emitted into the space between the rotor and casing to provide a fluid-type seal therebetween. A lip seal 22 made, for example, of plastic, is disposed about the pump shaft 17 between the rotor 16 and bearing assembly 18.

Details of the pump unit itself for effecting a pumping operation are not shown or described in detail since the present invention is only concerned with the mechanical coupling of the motor and pump.

Still referring to FIGURE 1, the upper end of the shaft 17 is shown at 17a and is surrounded by a cylindrical coupling sleeve 23. Defined within the inner surface of the sleeve 23 is a longitudinal slot 24 incorporating a key member 25, as shown.

Referring now to FIGURE 2, it will be seen that the motor shaft 11 has a slot 26 along its outer surface, the key member 25 being positioned to lie within the slots 24 and 26 thus locking the coupling sleeve 23 to the motor shaft 11 for rotation.

In the assembly of the invention, assuming the motor 10 and base plate 14 are separated by removal of the bolts 12 and 12', the bearing assembly 18, along with the pump shaft 17, is first inserted within the upper portion of the pump casing and secured therein by means of the retainer ring 19 and screws 20. The lip seal 22 is then brought up through the open bottom of the casing 13 and placed over the lower end of the shaft 17 adjacent to the lower end of the bearing assembly 18.

The pump rotor 16 is inserted into the open bottom of the casing 13 and press-fitted into engagement with the lower end of the pump shaft 17. The base plate 14 may then be secured to the pump casing by the bolts 12'.

The connection of the upper end 17a of the pump shaft to the motor shaft 11 involves the simple steps of securing the lower end of the coupling sleeve 23 over the shaft end 17a with a press-fit. The key member 25 is then positioned within the slot 24 disposed in the sleeve 23, and the slot 26 in the shaft 11 is aligned with and receives the key 25. The motor 10 and shaft 11 are then moved downwardly, pressing the end of the shaft 11 into the upper end of the sleeve 23 until the motor is in contact with the pump casing. The assembly is completed by then inserting the bolts 12 to secure the motor to the pump.

Should any of the assembled parts require maintenance or repair, the above-described operation may be simply reversed without causing damage to any of the elements of the unit.

From the foregoing description, it is apparent that this invention provides a greatly simplified arrangement enabling the ready assembly and disassembly of the parts, thus assuring ease of maintenance and repair.

Various changes falling within the scope and spirit of this invention will occur to those skilled in the art. The pump and motor assembly is, therefore, not to be thought of as limited to the specific embodiment set forth.

What is claimed is:

1. A method of coupling a pump rotor to a motor shaft, comprising the steps of: positioning a bearing assembly within a pump casing; mounting a pump shaft within said bearing assembly so that the ends of said pump shaft protrude therefrom; inserting a rotor over an end of said pump shaft with a press-fit engagement; securing one end of a coupling sleeve having a longitudinal interior slot over the other end of said pump shaft; inserting a key in said slot which extends radially inwardly from said slot; and inserting an end of said motor shaft having an exterial slot into the other end of said coupling sleeve such that said external slot receives the extending portion of said key.

2. In a vacum pump and motor assembly, the combination comprising: a pump shaft journaled within said pump with opposite ends exposed; a pump rotor press-fitted into engagement with one end of said opposite ends; a coupling sleeve having a longitudinal slot therein, said sleeve having one end thereof secured over the other of said opposite ends of said pump shaft for rotation therewith; a motor shaft coaxially aligned with said pump shaft and having a longitudinal slot along its outer surface; and a key member having a portion positioned within said slot in said motor shaft, said motor shaft being fitted within the other end of said coupling sleeve, with another portion of said key member being positioned within said slot in said sleeve.

3. The subject matter of claim 2, in which said pump shaft is journaled within said pump by means of a bearing assembly positioned within said pump; and a retainer ring positioned about said pump shaft adjacent to said bearing assembly for securing said bearing assembly in place.

4. A pump and motor assembly comprising: a motor having a motor shaft extending downwardly therefrom; a pump casing attached to said motor and having a cylindrical chamber therein; a bearing assembly positioned within said pump casing; a pump shaft positioned within said bearing assembly so as to be axially aligned with said motor shaft; a vane-type rotor mounted about the lower end of said pump shaft with a press-fit therewith and being eccentrically positioned within said chamber; a coupling sleeve having an end thereof fitted over the other end of said pump shaft and secured thereto for rotation therewith, the other end of said sleeve receiving said motor shaft therein, said motor shaft having a longitudinal slot along its outer surface, said sleeve having a longitudinal slot along its inner surface; and a key member positioned within said slots whereby said pump shaft is locked to said motor shaft for rotation thereby through said coupling sleeve.

References Cited
UNITED STATES PATENTS

| | | | |
|---|---|---|---|
| 1,082,183 | 12/1913 | Vernon | 230—139 |
| 1,934,155 | 11/1933 | Van Deventer | 230—139 |
| 1,974,678 | 9/1934 | Lafont | 103—87 |
| 2,363,419 | 11/1944 | Howard | 103—87 |

DONLEY J. STOCKING, *Primary Examiner.*

WILBUR J. GOODLIN, *Assistant Examiner.*